United States Patent
Chu et al.

(10) Patent No.: US 9,509,566 B2
(45) Date of Patent: Nov. 29, 2016

(54) SYSTEM AND METHOD FOR GENERATING OUTPUT DATA

(71) Applicant: YOKOGAWA ELECTRIC CORPORATION, Musashino-shi, Tokyo (JP)

(72) Inventors: Ka Wai Kathy Chu, Singapore (SG); Lin Naing Oo, Singapore (SG); Maricel Bacacao, Singapore (SG); Acelython Navarro, Singapore (SG); Chao Chen, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 292 days.

(21) Appl. No.: 13/929,057

(22) Filed: Jun. 27, 2013

(65) Prior Publication Data

US 2015/0006684 A1    Jan. 1, 2015

(51) Int. Cl.
*H04L 12/24* (2006.01)
*G06F 9/445* (2006.01)

(52) U.S. Cl.
CPC ....... *H04L 41/0873* (2013.01); *G06F 9/44552* (2013.01)

(58) Field of Classification Search
CPC .................. G06F 2221/2141; G06F 11/3051; G06F 17/30289; G06F 21/45; G06F 9/465; G06F 11/3072; G06F 12/1483; G06F 9/44552; G06F 21/554; G06F 17/30867; G06F 9/547; G06F 17/30174; G06F 3/1247; G06F 9/44505; G06F 13/385; G06F 8/61; G06F 8/71; G06F 9/50; G06F 9/5072; G06F 11/2087; G06F 2209/542; H04L 41/0226; H04L 41/04; H04L 41/08; H04L 41/0806; H04L 41/0813; H04L 41/0869; H04L 41/0873; H04L 41/12; H04L 41/5096; H04L 67/1095; H04L 63/123; H04L 67/2842; H04L 12/2602; H04L 41/046; H04L 67/34; H04L 29/08981; H04L 49/351; H04L 49/1523; H04L 49/354; H04L 49/355; H04L 61/2514; H04L 61/2517; H04L 63/0263; G06Q 10/10; H04W 76/022; H04W 92/02; H04W 92/06

See application file for complete search history.

(56) References Cited

U.S. PATENT DOCUMENTS

| | | | | |
|---|---|---|---|---|
| 7,568,182 | B2 * | 7/2009 | Villaron | G06F 9/44505 717/121 |
| 7,581,177 | B1 * | 8/2009 | Mollicone | G06F 17/227 715/243 |
| 2003/0182450 | A1 * | 9/2003 | Ong | G06F 17/30011 709/246 |
| 2008/0244693 | A1 * | 10/2008 | Chang | G06F 21/554 726/1 |
| 2010/0088587 | A1 * | 4/2010 | Ding | G06F 17/2288 715/229 |
| 2013/0047139 | A1 * | 2/2013 | Bolton | G06F 9/44505 717/121 |

FOREIGN PATENT DOCUMENTS

EP    1672497 A2    6/2006

OTHER PUBLICATIONS

Extended European Search Report dated Oct. 28, 2014, issued in European Patent Application No. 14167444.0. (10 pages).

* cited by examiner

*Primary Examiner* — Kevin Bates
*Assistant Examiner* — Ranjan Pant
(74) *Attorney, Agent, or Firm* — Westerman, Hattori, Daniels & Adrian, LLP

(57) ABSTRACT

The present invention relates to a primary apparatus for generating an output for use with a secondary apparatus, both apparatuses having a first configuration and second configuration respectively. A configuration validator determines if the first and second configurations are compatible with each other. A conflict module determines conflict between the first configuration and the second configuration. A corresponding system, software and method are also disclosed.

14 Claims, 5 Drawing Sheets

| | 400 | 402 | 404 | 406 | 408 |
|---|---|---|---|---|---|
| Scenarios | Client Version | Server Version | Available Conflict Feature Set Version(s) | Selected Conflict Set Version |
| A | R5.01 | R5.01 | R5.01 | R5.01 |
| B | R5.04 | R5.02 | R5.00<br>R5.01<br>R5.03<br>R5.04 | R5.01 |
| C | R5.03 | R5.04 | R5.03 | R5.03 |

Fig 4A

| | 410 | 412 | 414 | 416 | 418 |
|---|---|---|---|---|---|
| Scenarios | Client Version | Server Version | Available Output Generation Module Version(s) | Selected Output Generation Module Version |
| A | R5.01 | R5.01 | R5.01 | R5.01 |
| B | R5.04 | R5.02 | R5.00<br>R5.01<br>R5.03<br>R5.04 | R5.01 |
| C | R5.03 | R5.04 | R5.03 | R5.03 |

Fig 4B

SYSTEM AND METHOD FOR GENERATING OUTPUT DATA

FIELD OF INVENTION

This invention relates to a system and method for generating output data to be transferred from one apparatus to another apparatus.

BACKGROUND OF INVENTION

In a computing system where there are client and server computers, a user inputs data to a client computer which hosts client software. The client computer processes the input data and generates an output data in a format which is compatible with the server computer. The user then performs a transfer operation, such as an upload or download, from the client computer to the server computer for further processing.

It is common for software and applications to have multiple versions, each subsequent version having enhancements and/or additional features. Usually, there is only one version in each client and server computer. When the client computer generates output data for the server computer, it is done based on features in the client computer that are supported in the server computer. The output data generated by the client computer is only intended for a server computer that has a version which corresponds to the client. If the server computer has a different version, the client computer can proceed with the download operation which may not be acceptable or not processed correctly by the server computer. This causes a lack of data integrity.

In the prior art as illustrated in FIG. 1, there is only one to one mapping, which means that the client computer can only generate an output for a server computer which has a corresponding version. For a computing system which has different versions of software or applications, there is a need to setup multiple computers as clients or servers so as to ensure corresponding versions of software and applications are available for use to maintain data integrity when data is transferred during upload or download for processing. The data transfer has high failure rate when the software/application versions of the client computer and server computer are not compatible.

In the prior art, a method of ensuring a successful data transfer is to check that the input data for the client computer is compatible with the target server computer. This is done by verifying each of the input data feature with features which are supported by the target server computer. This is inefficient for computer resources (such as memory, processors and so forth), and human resources (due to time spent on the comparison process).

Alternatively, client and corresponding server computer must be upgraded simultaneously for every new software or application version. However, this causes unnecessary downtime of computing resources. For example, a new version for minor enhancement in the client computer is not necessary to be installed in the corresponding server which is not affected by the changes on the client computer. In another example, there are different upgrade schedules for the client and the corresponding server in the case where the client requires further preparation work after upgrade while the corresponding server has to be in continuous operation.

In addition, output data is generated by an Output Generation Module which can only generate an output data which is compatible with one version. Therefore, there is a corresponding Output Generation Module for each revision. Furthermore, each Output Generation module can only generate one type of output data format. When the output data format is different for another server, a different Output Generation Module is required.

There is a need for a more optimal way to perform output data generation for a computing system.

SUMMARY OF THE INVENTION

In a first aspect, there is provided a primary apparatus for generating an output for use with a secondary apparatus. The primary apparatus comprises a configuration validator for determining if a first configuration of the primary apparatus and a second configuration of the secondary apparatus are compatible; and a conflict module for determining conflict between the first configuration and the second configuration. The primary apparatus may further include a data source validator for either skipping or filtering unsupported features.

Each of the first configuration, the second configuration, and an output generation module preferably includes a version identifier. Each configuration is preferably associated with a conflict feature set. Preferably, where a version of the output generation module corresponds to a version of the second configuration, the output data from the generation module is able to be processed in an appropriate manner. In addition, where there is a plurality of the output generation modules, there further includes an output generation module selector for selecting an output generation module having a same version identifier as the second configuration.

It is preferable that where there is a plurality of conflict feature sets, the conflict module further includes either a conflict version selector or a manual configuration module for selecting a conflict feature set. It is preferable that the conflict version selector selects the conflict feature set having the same version identifier as the second configuration.

It is also preferable that where no conflict feature set has the same version identifier as the second configuration, the conflict version selector selects the conflict feature set having a version identifier which precedes the second configuration version identifier.

In a second aspect, there is provided a secondary apparatus for receiving an output from a primary apparatus. The secondary apparatus comprises a configuration validator for determining if a first configuration of the primary apparatus and a second configuration of the secondary apparatus are compatible; and a conflict module for determining conflict between the first configuration and the second configuration.

In a third aspect, there is also provided a system for generating output data using the primary apparatus, with the secondary apparatus receiving the output data.

In a fourth aspect, there is provided a method, implemented on a primary apparatus, for generating an output for use with a secondary apparatus from input to a primary apparatus. Preferably, each apparatus has a first and a second configuration respectively. The method comprises determining if the first configuration is compatible with the second configuration; and when the first and second configurations are compatible, determining a conflict between the first configuration and the second configuration.

It is preferable that each of the first configuration, the second configuration includes a version identifier. Preferably, each configuration is associated with a conflict feature set.

The method may further include selecting the conflict feature set having a version identifier which precedes the second configuration version identifier when no conflict feature set version identifier is identical to the second configuration version identifier.

In addition, the method may further includes selecting a conflict feature set using a manual configuration module when there is a plurality of conflict feature sets.

In a final aspect, there is provided a software program for use on a primary apparatus, the software being for generating an output for use with a secondary apparatus. The software program comprises a configuration validator for determining if a first configuration of the primary apparatus and a second configuration of the secondary apparatus are compatible; and a conflict module for determining conflict between the first configuration and the second configuration.

DESCRIPTION OF THE FIGURES

In order that the present invention might be more fully understood, embodiments of the invention will be described, by way of example only, with reference to the accompanying drawings, in which:

FIGS. 4(a) and 4(b) are tables illustrating examples of operational scenarios.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill of the art that the present invention may be practiced without these specific details. In other instances, well known methods, procedures, components, and features have not been described in detail as not to unnecessarily obscure aspects of the present invention.

Figure 1:
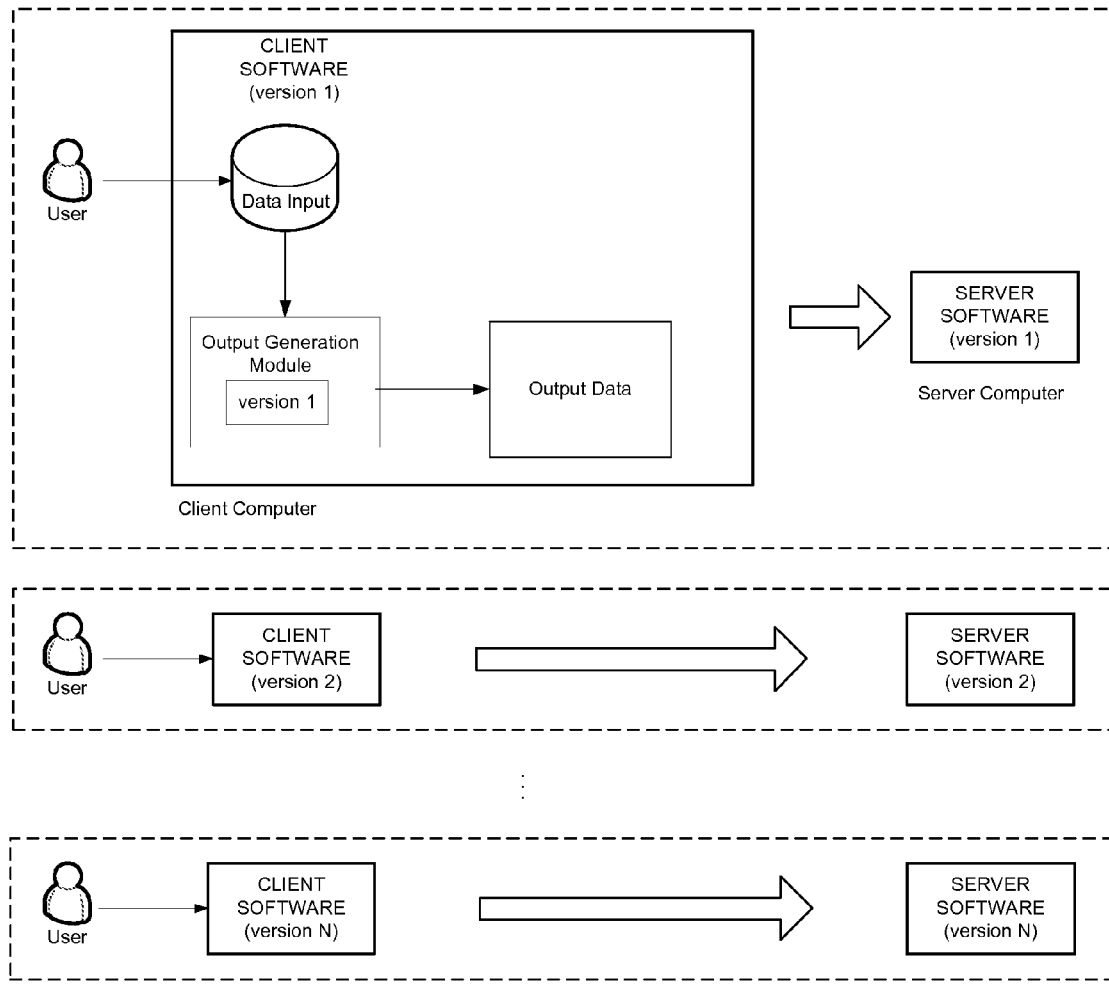
FIG. 1 is an illustration of prior art.
Figure 2:
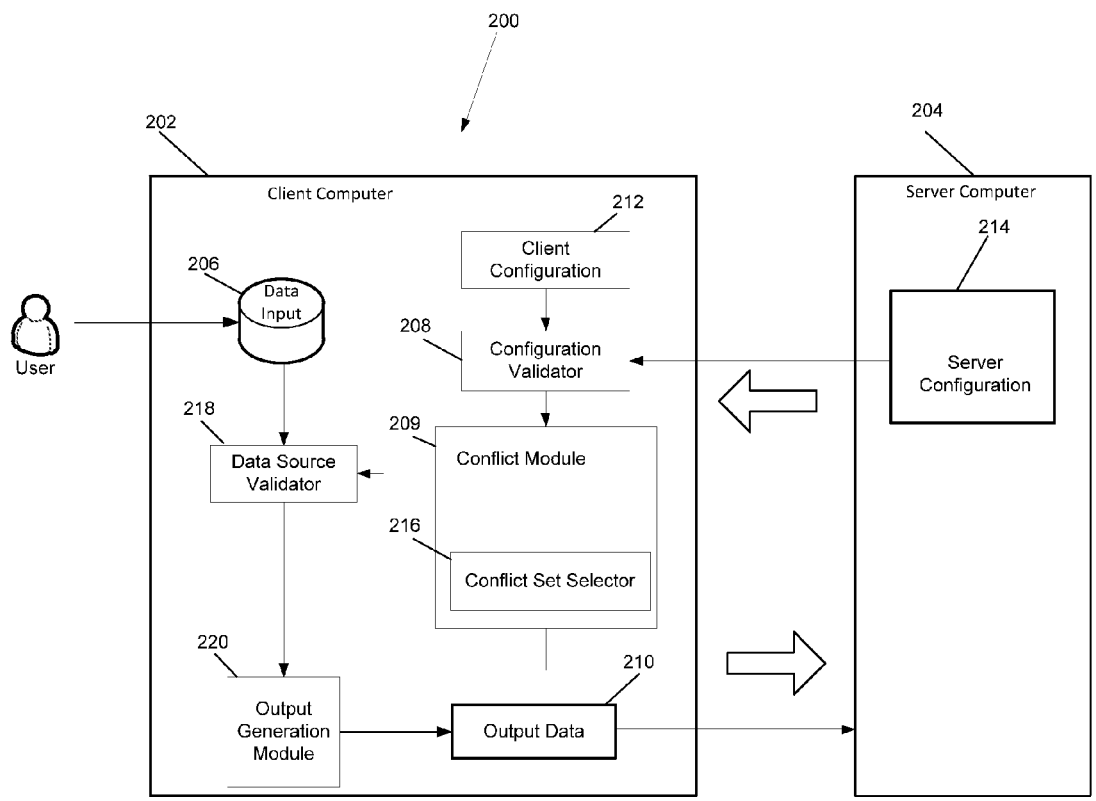
FIG. 2 is a schematic illustration of a preferred embodiment of a system of the present invention.
Figure 3:
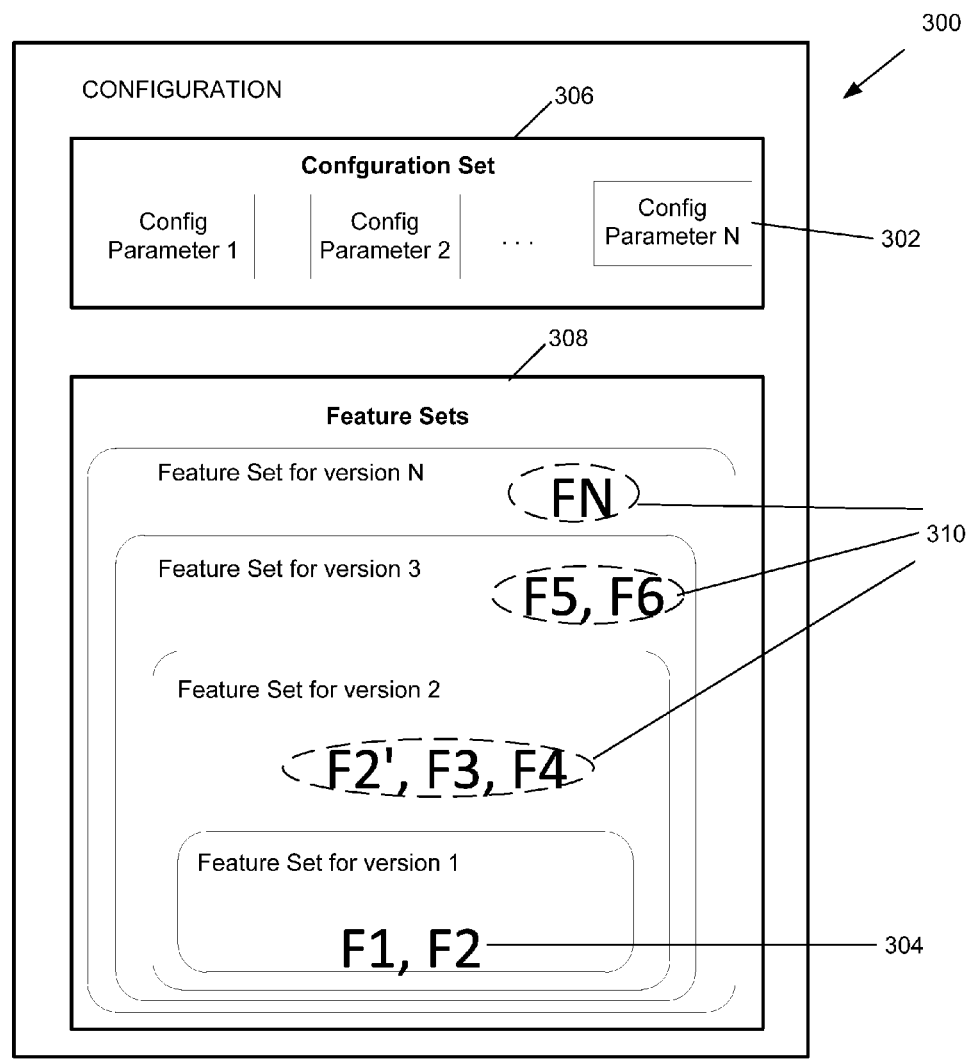
FIG. 3 is a schematic illustration of a preferred embodiment of a configuration of an apparatus used in the system of FIG. 2.

Referring to FIG. 2, the present invention relates to a primary apparatus 202 for generating an output data 210 from the primary apparatus 202 to a secondary apparatus 204 in a system 200. Example of the primary apparatus 202 is a client computer and an example of the secondary apparatus 204 is a server computer, vice versa or of the same time—both are clients or both servers. Both apparatuses 202, 204 have at least one common software or application. The software or application on both apparatuses 202, 204 are of different versions. For the software or application, each computer has a configuration 300. An example of the configuration 300 is illustrated in FIG. 3. Each configuration 300 has several parameters 302 and features 304. These features are format definitions for the parameters. Each configuration version has a version identifier for the configuration 300. For a new version, there are additional/variation/enhancement of features.

The present invention also relates to the secondary apparatus 204 in the system 200 for receiving the output data 210 from the primary apparatus 202. Example of the primary apparatus 202 is a client computer and an example of the secondary apparatus 204 is a server computer, vice versa or of the same time—both are clients or both servers. Both apparatuses have at least one common software or application. The software or application on both apparatuses are of different versions. For the software or application, each apparatus has a configuration 300.

Data input by a user is received by the first computer 202. The user input data is entered manually by the user using any input/output device such as a keyboard, touchscreen display, a data storage device with an auto-run data file, and so forth. Correspondingly, a source file which has a format compatible with the primary apparatus 202 is generated. The primary apparatus 202 reads the source file for further data processing. The input data is stored in a Data Source Database 206. After the user enters the input data for a specified software or application, the user initiates a transfer operation for sending the input data from the primary apparatus 202 as output data 210 to the secondary apparatus 204. The output data 210 is data which will undergo further processing in the secondary apparatus 204. Alternatively, the output data 210 can be the configuration 300 to be updated in the software or application of the secondary apparatus 204.

The transfer operation is started by first establishing a network connection between both apparatuses 202, 204, and then further between the relevant software or application in both apparatuses 202, 204. A configuration validator 208 determines if a first (of the primary apparatus 202) and a second configurations (of the secondary apparatus 204) 212, 214 are compatible with each other. This is determined by comparing the configuration versions of the primary 202 and second apparatus 204 with each other. Alternatively, this is done by comparing the parameters in the configurations.

After both configurations 212, 214 are determined to be compatible, a conflict module 209 is used to determine conflict between the configurations 212, 214. A conflict occurs when at least one feature in the first configuration 212 causes conflict when output data with the at least one feature is transferred to the second configuration 214. Examples when conflict occur include instances when: a feature is not found in the second configuration 214; a feature varies from the same feature in the second configuration 214, a feature which is not identical to the one in the first configuration 212 due to a change in structure and so forth.

There are various methods, algorithms and algorithms for identifying a conflict feature. In a preferred embodiment, a conflict feature is stored in a conflict feature set. The version for a conflict feature set is the same as that for a particular configuration. For example, configuration version 1.0 has features F1, F2, configuration version 2.0 has features F1, F2', F3, F4. F2' is a minor change from F2 while F3, F4 are new features. Conflict feature set 2.0 has features F2', F3, F4. Configuration version 3.0 has features F1, F2', F3, F4, F5, F6. Conflict feature set 3.0 has features F5 and F6. In this example, there is no intermediate configuration versions between 1.0 to 2.0, 2.0 to 3.0. A conflict feature set can include a compilation/collection/accumulation of conflict feature sets. For example, a compilation of conflict feature sets 3.0 and 2.0 has features F2', F3, F4, F5, F6 for features in configuration version 3.0 which are in conflict with configuration version 1.0.

Referring to FIG. 3, a schematic view of a configuration 300 is shown for illustration purposes. The configuration 300 includes a configuration set 306, and a collection of feature sets 308. Referring to an earlier portion of the description, configuration version N.0 is a collection of configuration sets versions 1.0 to N. The feature sets improve the efficiency of identifying conflict features in the conflict module 209.

The configuration 300 may store new features of a new revision separately, in a different memory or different structure, from the features of preceding revision. This mode of storage improves the processing efficiency of the software or application. Thus, a conflict set is obtained in an appropriate manner from the relevant memory storage or structure.

There can be a database with a plurality of conflict feature sets 310. A conflict set selector 216 is used for selecting an appropriate conflict feature set. A search is carried out by comparing versions for the plurality of conflict feature sets with the second configuration 214. When there is a match, the conflict feature set version is same as the second configuration 214, the conflict feature set is with the matching version chosen.

When there is no match, the conflict feature set selector 216 identifies a preceding version, the preceding version being one that is earlier than the second configuration 214 and/or a most recent version.

A table of some operational scenarios is shown in FIG. 4A. Column 400 identifies the various scenarios. A first/client configuration 212 version is shown in column 402, a second/server configuration version 214 is shown in column 404, available conflict feature set versions are shown in column 406, and the selected conflict feature set version is shown in column 408. In Scenario A, the first configuration 212 version is R5.01 and second configuration 214 version is R5.01. Since there is a match, the selected conflict feature set is R5.01.

In Scenario B, there is no matching conflict feature set version. Given that the preceding version for the second configuration 214 version R5.02 is R5.01, conflict feature set version R5.01 is thus selected. Choosing conflict feature set version R5.03 or R5.04 may cause conflict or errors.

When no conflict feature set has a version which is the same as the second configuration 214 version, there is an option for the user to select a conflict feature set version. A manual configuration module can be made available for the user to select a conflict feature set version. The manual configuration module may provide a listing of conflict feature set versions for the user's selection. A further option is to provide a listing of features for selection.

Using Scenario B for illustration, the second configuration 214 received from the secondary apparatus 204 is R5.02, and the conflict version selector 216 selects conflict feature set R5.01. However, the user knows that the second configuration 214 is actually R5.03 after checking the configuration from the physical apparatus or other means. There may also be transmitting errors due to network or other causes that the user does not have time to resolve before the data transfer. In another instance, the second configuration 214 version is R5.05 and the user knows that the new version has an additional feature or algorithm change which does not affect the data transfer/cause conflict issues, so conflict feature set version R5.04 can be selected manually.

Advantageously, this acts as a safety net which allows the user to be in control to complete the data transfer success-fully for abnormal or unexpected situations. Another advantage is when data source validator 218 validates the input data (the validating process is described below), the data source validator 218 skips or filters unsupported features instead of terminating the output data generation process prematurely with error.

A data source validator 218 of the primary apparatus 202 determines if the input data includes features in the selected conflict feature set 310. When the features in the selected conflict feature set 310 are not in the input data, the input data is determined to be valid. There are less features in the selected conflict feature set compared to the features in the first 212 and/or second 214 configurations as it is more efficient to use a smaller list of features in the conflict feature set 310 for validating the input data compared to using all the features in the second configuration 214. By validating the input data, there is better data integrity for the secondary apparatus 204. Less time and effort is spent on troubleshooting errors, and memory usage is reduced at the same time.

An output generation module 220 of the primary apparatus 202 processes the validated input data which does not have features in the conflict feature set 310, to generate output data 210 to the secondary apparatus 204. Since the output data 210 does not have any feature which is in conflict with the second configuration 214, the output data 210 is suitable to be processed in the second configuration 214 of software or application. The output generation module 220 generates the output data 210 in a format which is suitable for the second configuration 214.

The output generation module 220 is usually unique to a subsequent configuration version. Therefore, there is a plurality of output generation modules 220 in the primary apparatus 202, each for an corresponding second configuration 214 version. Each output generation module 220 version is identified by a version identifier. An output generation module selector may be used for selecting an output generation module 220 which has a version identical to the second configuration 214 version. The selection is done by comparing the versions for the plurality of output generation modules 220 with the second configuration 214 version. When there is a match, the output generation module 220 version is same as the second configuration 214 version, the output generation module 220 with the matching version chosen.

When there is no match, the output generation module selector subsequently identifies a preceding version, the preceding version being one that is earlier than the second configuration 214 and/or a most recent version.

Another table of operational scenarios is shown in FIG. 4B. Column 410 identifies the various scenarios. A first/client configuration 212 version is shown in column 412, a second/server configuration 214 version is shown in column 414, available output generation module 220 versions are shown in column 416, and the selected output generation module 220 version is shown in column 418. In Scenario A, the first configuration 212 version is R5.01 and second configuration 214 version is R5.01. Since there is a match, the selected output generation module 220 version is R5.01.

In Scenario B, there is no matching output generation module 220 version. Given that the preceding version for the second configuration 214 version R5.02 is R5.01, output generation module version R5.01 is thus selected. Choosing output generation module 220 version R5.03 or R5.04 may cause conflict or errors.

When no output generation module 220 has a version which is the same as the second configuration 214 version, there is an option for the user to select a output generation module 220 version. Preferably, a manual configuration module can be made available for the user to select an output generation module 220 version. The manual output generation module 220 may provide a listing of output generation module 220 versions for the user's selection.

Using Scenario B for illustration, the second configuration 214 received from the secondary apparatus 204 is R5.02, and the output generation module 220 version selector selects output generation module version R5.01. However, the user knows that the second configuration 214 is actually R5.03 after checking the configuration from the physical apparatus or other means. There may also be transmitting errors due to network or other causes that the user does not have time to resolve before the data transfer. In another instance, the second configuration 214 version is R5.05 and the user knows that the new version has an additional feature or algorithm change which does not affect the data transfer/cause conflict issues, so output generation module version R5.04 can be selected manually.

Preferably, the output generation module selector is in the configuration validator 208. Advantageously, this allows the system to be scalable. When a user is going to a remote location for performing data transfer from the primary apparatus 202 to the secondary apparatus 204, the user only needs to bring the relevant output generation module version instead of all the versions available.

It should be appreciated that the aforementioned processes are carried out by at least one software program installed for use in the primary apparatus 202 and the secondary apparatus 204. Without the at least one software program, the aforementioned processes would not be able to be carried out.

According to a preferred embodiment of the present invention, a software or application in the client/primary apparatus 202 can interact with multiple versions of a corresponding software or application in a server/secondary apparatus 204. In systems where there are multiple apparatuses with each apparatus having a different software version, using the present invention, the client/primary apparatus 202 can transfer data to any another apparatus efficiently by validating the data using conflict features. There is no need to maintain multiple versions for software or applications in different apparatuses for the data transfer. This saves cost on memory and other resources while providing more flexibility in the client.

In computing systems where each of the multiple client/first software versions operates from different apparatuses, a number of apparatuses is minimized, correspondingly reducing the operational cost. Furthermore, the user does not have to identify which version of client software is usable for data transfer to the corresponding server software. This reduces user training requirements and learning cost, subsequently improving productivity through fewer operational mistakes and confusion. Since the present invention allows data transfer to be done reliably when client and server software versions are different, client and server software versions are able to be upgraded independently and yet be operationally reliable.

One or all of the modules described above—conflict version selector, manual configuration module, data source validator 218, output generation module 220—can be stored and accessed from the primary apparatus 202, a different apparatus or external storage, to process the input data and generate the output data 210.

Configuration or configuration set is a file with parameters, features, instructions, definitions for any software such as user applications, server processes or operating system settings.

Examples of parameters include Version number; Network TCP/IP address; Domain name, Redundancy; Machine Name; Username; User group; Software specifications such as Operation System, Anti-virus, IT Security; Hardware specifications such as Processor, Memory; License keys; Server Type.

Examples of features include: protocol, plug-in, components, units, parts, items, ingredients, pieces, segments, elements, modules, peripherals and constituents.

Figure 5:
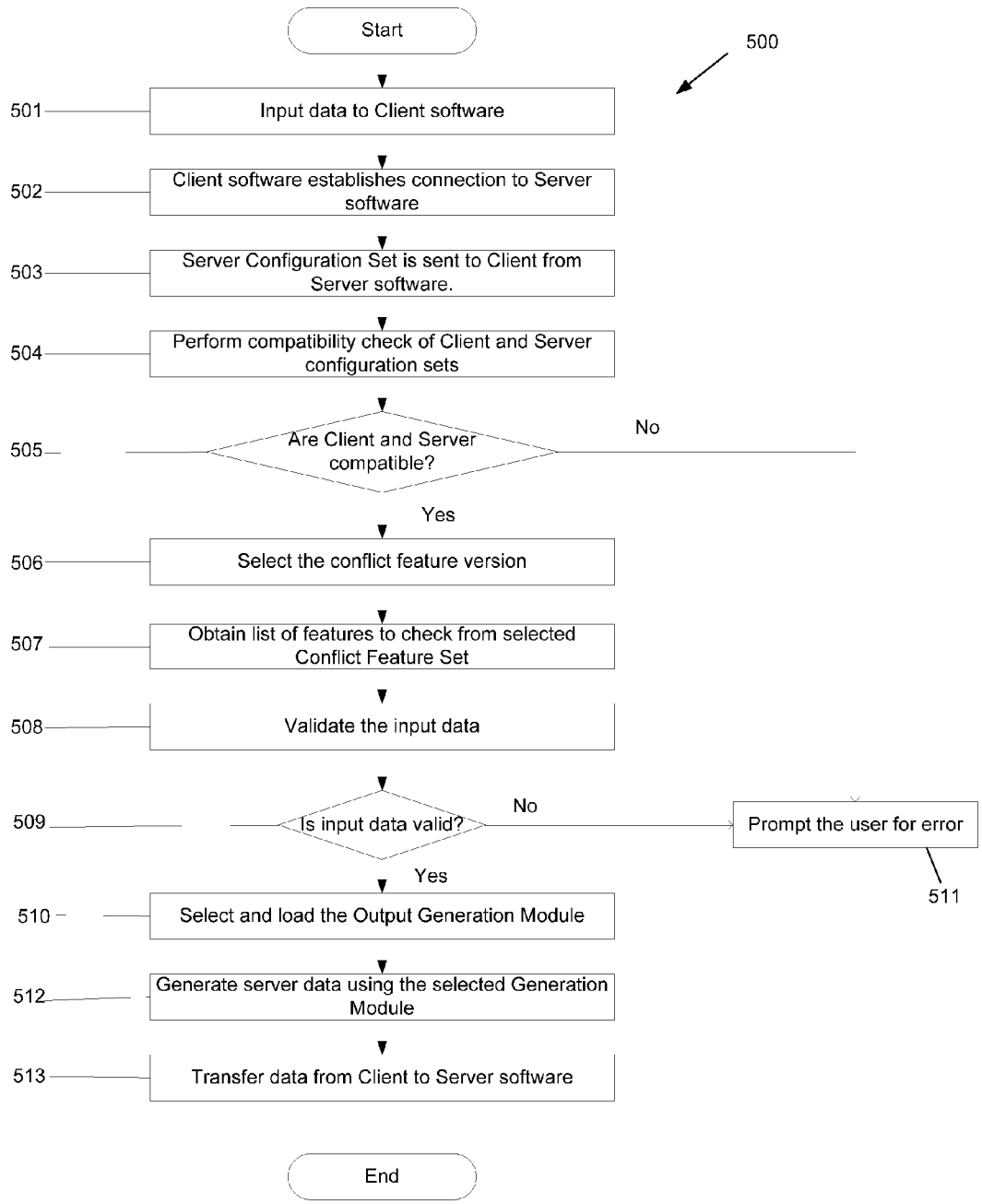
FIG. 5 is a process flow for a preferred embodiment of a method of the present invention.

According to another aspect of the invention, a method 500 implemented on a apparatus for generating an output data is illustrated in FIG. 5. It should be appreciated that the requisite components described in the earlier paragraphs will be labeled identically in the subsequent paragraphs. In Step 501, a user provides input data by using an input/output device to a primary apparatus 202. The primary apparatus 202 has a first configuration for the desired software. In Step 502, the primary apparatus 202 establishes connection with the secondary apparatus 204, the desired software in the primary apparatus 202 establishes connection with the corresponding desired software in the secondary apparatus 204. The connection is established based on the communication protocol used for both apparatuses to be in communication. The secondary apparatus 204 has a second configuration for its desired software.

Step 503, the second configuration is sent from the secondary apparatus 204 and received by the primary apparatus 202 in Step 503. The second configuration is sent based on the communication protocol used for both apparatuses to be in communication. Steps 504, 505 determine if the first configuration and second configuration are compatible. If not compatible, the user is prompted of the error at Step 511.

When both configurations are determined to be compatible, a conflict feature is identified in Step 506. Preferably, a conflict feature set 310 is provided for each version of software or application configuration. The conflict feature set 310 is assigned a version identifier for ease of identification. A conflict version selector 216 selects a suitable version identifier. The most suitable version identifier is one which is identical to the second configuration version identifier. If there is no identical version identifier, the version identifier which precedes the second configuration version identifier is selected. The preceding version is one that is earlier than the second configuration version and the most recent.

Preferably, a manual configuration module is provided for the user to select the version identifier manually when a manual selection is more suitable.

In Step 507, the list of features in the selected conflict feature set 310 is obtained for validating the input data in Step 508. This is performed by determining if any feature in the conflict feature set 310 is in the input data. When the input data is determined not to have any feature in the conflict feature set 310, an output data is generated. If the input data is not able to be validated, the user is prompted of the error at Step 511.

An output generation module 220 is provided to generate data output 210 which is suitable for the desired version of software/application configuration in the secondary apparatus 204. Preferably each output generation module 220 has a version identifier. In Step 510, a suitable output generation module 220 is selected. A suitable selection is an output generation module 220 which has the same version identifier as the second configuration. The selected output generation module 220 is then loaded to generate an output data in Step 512. Step 513 transfers the output data from the primary apparatus 202 to the secondary 204. The transfer based on the communication protocol used for both apparatuses 202, 204 to be in communication.

It should also be appreciated that the aforementioned method 500 is carried out by at least one software program installed for use in the primary apparatus 202 and the secondary apparatus 204. Without the at least one software program, the aforementioned method 500 would not be able to be carried out.

The invention claimed is:

1. A primary apparatus for generating an output for use with a secondary apparatus, the primary apparatus comprising a computer configured with: a configuration validator for determining if a first configuration of the primary apparatus corresponds with a second configuration of the secondary apparatus; a conflict module for determining a conflict between the first configuration and the second configuration; a data source validator for either skipping or filtering unsupported features in an input to the primary apparatus after the conflict is determined by the conflict module, the input being a source file having a format supported by the first configuration and the unsupported features including features not supported in the second configuration; and an output generation module to generate the output based on the input after the unsupported features have been skipped or filtered by the data source validator, wherein each of the first configuration and the second configuration is associated with a conflict feature set.

2. The apparatus as claimed in claim 1, wherein each of the first configuration, the second configuration, and the output generation module includes a version identifier.

3. The apparatus as claimed in claim 2, wherein where there is a plurality of conflict feature sets, the conflict module further includes either a conflict version selector or a manual configuration module for selecting a conflict feature set, wherein the conflict feature set includes at least one feature in one of the first configuration and the second configuration, the at least one feature is in conflict with the other of the first configuration and the second configuration.

4. The apparatus as claimed in claim 3, wherein the conflict version selector selects the conflict feature set having the same version identifier as the second configuration.

5. The apparatus as claimed in claim 4, wherein where no conflict feature set has the same version identifier as the second configuration, the conflict version selector selects the conflict feature set having a version identifier which precedes the second configuration version identifier.

6. The apparatus as claimed in claim 2, wherein where a version of the output generation module corresponds to a version of the second configuration, the output data from the generation module is processed in the second configuration.

7. The apparatus as claimed in claim 2, wherein where there is a plurality of the output generation modules, there further includes an output generation module selector for selecting an output generation module having a same version identifier as the second configuration.

8. A secondary apparatus for receiving an output from a primary apparatus, the secondary apparatus comprising a computer configured with: a configuration validator for determining if a first configuration of the primary apparatus corresponds with a second configuration of the secondary apparatus; a conflict module for determining conflict between the first configuration and the second configuration; a data source validator for either skipping or filtering unsupported features in an input to the primary apparatus after the conflict is determined by the conflict module, the unsupported features including features not supported in the second configuration; and an output generation module to generate the output based on the input after the unsupported features have been skipped or filtered by the data source validator, wherein each of the first configuration and the second configuration is associated with a conflict feature set.

9. A system for generating output data using the primary apparatus of claim 1, with the secondary apparatus of claim 8 receiving the output data.

10. A method, implemented on a primary apparatus, for generating an output for use with a secondary apparatus from input to a primary apparatus, each apparatus having a first and a second configuration respectively, the method comprising: determining if the first configuration corresponds with the second configuration; determining a conflict between the first configuration and the second configuration; filtering unsupported features in an input to the primary apparatus after the conflict is determined by said determining, the input being a source file having a format supported by the primary apparatus and the unsupported features including features not supported in the second configuration; and generating the output based on the input after the unsupported features have been filtered by said filtering, wherein each of the first configuration and the second configuration is associated with a conflict feature set, wherein the conflict feature set includes at least one feature which is not in one of the first configuration and the second configuration, and wherein said determining uses the conflict feature set to determine the conflict.

11. The method as claimed in claim 10, wherein each of the first configuration, the second configuration includes a version identifier.

12. The method as claimed in claim 11, further including selecting the conflict feature set having a version identifier which precedes the second configuration version identifier when no conflict feature set version identifier is identical to the second configuration version identifier.

13. The method as claimed in claim 11, further includes selecting a conflict feature set using a manual configuration module when there is a plurality of conflict feature sets.

14. A non-transitory computer readable storage medium storing a computer program to be executed by a computing system for use on a primary apparatus, the computer program causing the computing system to perform the steps of: determining if a first configuration of the primary apparatus corresponds with a second configuration of a secondary apparatus; determining a conflict between the first configuration and the second configuration; either skipping or filtering unsupported features in an input source file to the primary apparatus after the conflict is determined by said determining, the input source file having a format supported by the primary apparatus and the unsupported features include features not supported in the second configuration; and generating an output for use with the secondary apparatus based on the input after the unsupported features have been skipped or filtered by said skipping or filtering, wherein each of the first configuration and the second configuration is associated with a conflict feature set, wherein the conflict feature set includes at least one feature which is not in one of the first configuration and the second configuration, and wherein said determining uses the conflict feature set to determine the conflict.

* * * * *